US011716213B2

(12) United States Patent
Wilson et al.

(10) Patent No.: US 11,716,213 B2
(45) Date of Patent: Aug. 1, 2023

(54) AUTONOMOUS SCREENSHARE OF DYNAMIC MAGNIFICATION VIEW WITHOUT PRIMARY COLLABORATION INTERRUPTION

(71) Applicant: International Business Machines Corporation, Armonk, NY (US)

(72) Inventors: Madeleine Wilson, Austin, TX (US); Jordan Hodges, Oakland, CA (US); Kimberly Flores, Stockton, CA (US); Carly Joanne Fife, Tucson, AZ (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/308,284

(22) Filed: May 5, 2021

(65) Prior Publication Data

US 2022/0360463 A1 Nov. 10, 2022

(51) Int. Cl.
*H04L 12/18* (2006.01)
*G06F 9/451* (2018.01)
*H04L 67/02* (2022.01)
*H04L 65/403* (2022.01)

(52) U.S. Cl.
CPC .......... *H04L 12/1813* (2013.01); *G06F 9/452* (2018.02); *H04L 65/403* (2013.01); *H04L 67/02* (2013.01)

(58) Field of Classification Search
CPC ... H04L 12/1813; H04L 65/403; H04L 67/02; G06F 9/452
USPC ........................................................ 709/204
See application file for complete search history.

(56) References Cited

U.S. PATENT DOCUMENTS

| 9,465,803 | B2 | 10/2016 | Sik | |
|---|---|---|---|---|
| 2005/0237376 | A1* | 10/2005 | Roessler | H04N 21/21805 348/14.09 |
| 2012/0005588 | A1* | 1/2012 | Bastide | G06Q 10/10 715/741 |
| 2012/0089928 | A1* | 4/2012 | Bryant | H04L 12/1827 715/753 |
| 2012/0117153 | A1* | 5/2012 | Gunasekar | G06Q 10/10 709/204 |
| 2013/0073965 | A1* | 3/2013 | Sik | G06F 16/4393 715/730 |

(Continued)

OTHER PUBLICATIONS

Lim, Keun-Woo, Jisu Ha, Puleum Bae, JeongGil Ko, and Young-Bae Ko. "Adaptive frame skipping with screen dynamics for mobile screen sharing applications." IEEE Systems Journal 12, No. 2 (2016): 1577-1588. (Year: 2016).*

(Continued)

*Primary Examiner* — Jeffrey R Swearingen
(74) *Attorney, Agent, or Firm* — Marcus Walker; Heather Johnston

(57) ABSTRACT

Sharing a perspective view with users in a web conference by identifying each user participating in a web conference, determining a role of at least two users participating in the web conference, determining a first user provides screen content to the web conference, wherein the provided screen content of the first user corresponds to a first view of the first user, generating a second perspective view of the provided screen content of the first user for a second user, and providing the second view of the provided screen content to the second user.

20 Claims, 4 Drawing Sheets

(56) References Cited

U.S. PATENT DOCUMENTS

| | | | |
|---|---|---|---|
| 2014/0047045 A1* | 2/2014 | Baldwin | G06Q 20/384 |
| | | | 707/738 |
| 2014/0149519 A1* | 5/2014 | Redfern | H04L 65/403 |
| | | | 709/204 |
| 2014/0232814 A1* | 8/2014 | Malhotra | H04N 7/15 |
| | | | 348/14.07 |
| 2014/0237390 A1* | 8/2014 | Davidson | G06Q 10/10 |
| | | | 715/753 |
| 2015/0033146 A1 | 1/2015 | Wu | |
| 2016/0357495 A1* | 12/2016 | Moorjani | G09G 5/14 |
| 2019/0251884 A1 | 8/2019 | Burns | |
| 2019/0333280 A1* | 10/2019 | Egeler | G06T 19/006 |
| 2020/0106813 A1* | 4/2020 | Vendrow | H04L 65/4015 |
| 2020/0201512 A1 | 6/2020 | Faulkner | |
| 2020/0293261 A1 | 9/2020 | Janamanchi | |
| 2022/0303501 A1* | 9/2022 | Jeyakumar | G06F 3/0481 |

OTHER PUBLICATIONS

Butt, Abbas Ali, Jaehyuk Park, and Yong-Moo Kwon. "Design and implementation of web-based collaborative social curation." In 2014 International Conference on Collaboration Technologies and Systems (CTS), pp. 19-26. IEEE, 2014. (Year: 2014).*

"Annotate: Web Annotations with Screen Sharing", chrome web store, updated Apr. 14, 2021, 6 pps., <https://chrome.google.com/webstore/detail/annotate-web-annotations/gdojjgflncpbcfmenbkndfhoamlhajmf>.

"Visual Studio Live Share", © Microsoft 2021, 4 pps., <https://visualstudio.microsoft.com/services/live-share/>.

"Zoom for Google Chrome", chrome web store, updated Nov. 19, 2020, 6 pps., <https://chrome.google.com/webstore/detail/zoom-for-google-chrome/lajondecmobodlejlcjllhojikagldgd?hl=en-GB>.

Mell et al., "The NIST Definition of Cloud Computing", National Institute of Standards and Technology, U.S. Department of Commerce, NIST Special Publication 800-145, Sep. 2011, 7 pages.

Soler, "New Feature: Follow Your Collaborators", MURAL, Mar. 12, 2015, <https://www.mural.co/blog/new-feature-facilitation-tools>.

White, "Ineffective Meetings Cost Companies Up to $283 Billion a Year (So Streamline Collaboration With These Tips)", Oct. 19, 2017, Inc., 8 pps., <https://www.inc.com/john-white/ineffective-meetings-cost-companies-up-to-283-billion-a-year-streamline-collaboration-with-these-tips.html>.

* cited by examiner

AUTONOMOUS SCREENSHARE OF DYNAMIC MAGNIFICATION VIEW WITHOUT PRIMARY COLLABORATION INTERRUPTION

BACKGROUND

The disclosure relates generally to web conferencing. The disclosure relates particularly to sharing a perspective view with users in a web conference.

In recent years, numerous factors have accelerated the process of remote working. However, prior to acceleration, employees collaborating with coworkers over the Internet has been a priority, which, increases the frequency of screensharing documents during virtual meetings (e.g., web conferences). Web conferencing is used as an umbrella term for various types of online conferencing and collaborative services including webinars (web seminars), webcasts, and web meetings. In general, web conferencing is made possible by Internet technologies, particularly on Transmission Control Protocol and Internet Protocol (TCP/IP) connections. Services may allow real-time point-to-point communications as well as multicast communications from one sender to many receivers. Additionally, offering data streams of text-based messages, voice and video chat to be shared simultaneously, across geographically dispersed locations. Applications for web conferencing include meetings, training events, lectures, or presentations from a web-connected computer to other web-connected computers.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products sharing a perspective view with users in a web conference.

Aspects of the invention disclose methods, systems and computer readable media associated with sharing a perspective view with users in a web conference by identifying each user participating in a web conference, determining a role of at least two users participating in the web conference, determining a first user provides screen content to the web conference, wherein the provided screen content of the first user corresponds to a first view of the first user, generating a second perspective view of the provided screen content of the first user for a second user, and providing the second view of the provided screen content to the second user.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
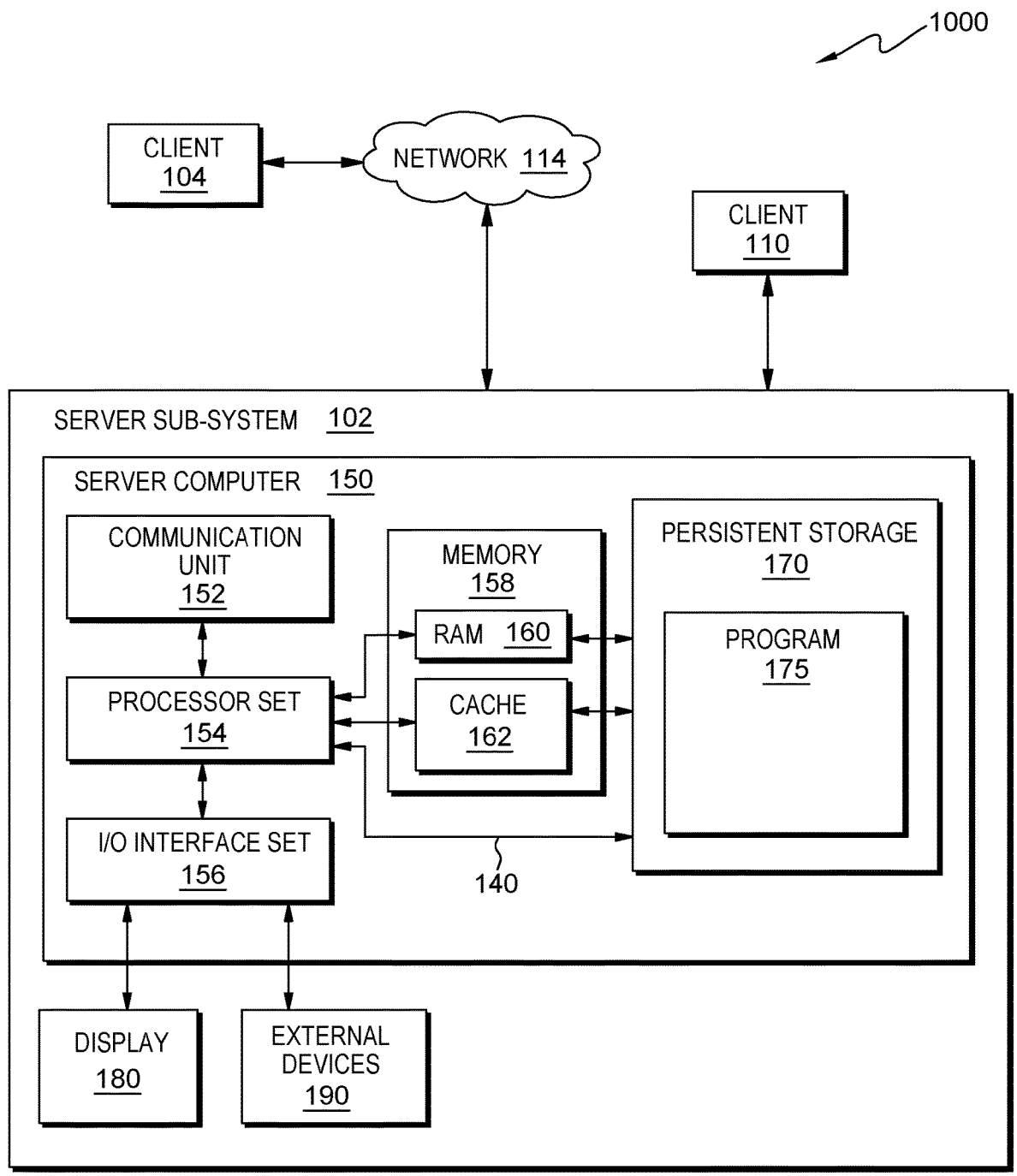
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Due to an acceleration in the process of remote working, collaborators face challenges in collaborating with coworkers over the Internet. For example, the process of screensharing documents during virtual meetings (e.g., web conferences) comes with inherit challenges such as referenced text is often too small to read or just offscreen, etc. As a result, participants may interrupt the presenter to ask them to zoom in on or move the text, which causes additional utilization of processing and networking resources to corresponding to the additional request/task. Embodiments of the present invention allow for simpler collaboration between coworkers when screensharing in virtual meetings. Embodiments of the present invention enable a user to dynamically zoom into/out of shared screen content of a presenter during a presentation. This results in the user viewing the screen share content of the presenter with ease while avoiding interrupting the flow of the meeting. In addition, embodiments of the present invention provide a capability to share a magnified screen of the user with other users, which facilitates easier collaboration.

In an embodiment, one or more components of the system can employ hardware and/or software to solve problems that are highly technical in nature (e.g., determining a role of at least two users participating in the web conference, determining a first user provides screen content to the web conference, generating a second perspective view of the provided screen content of the first user for a second user, providing the second view of the provided screen content to the second user, etc.). These solutions are not abstract and cannot be performed as a set of mental acts by a human due to the processing capabilities needed to facilitate generating a second perspective view of the provided screen content of the first user for a second user, for example. Further, some of the processes performed may be performed by a specialized computer for carrying out defined tasks related to memory operations. For example, a specialized computer can be employed to carry out tasks related to generating perspective views of the first user for a second user with autonomous techniques or the like. Disclosed embodiments enable the ability to share an "experience" (e.g., generated perspective) of a first user with a second user during a live broadcast of a social collaboration event, which may include someone sharing for a highly specific purpose to accommodate a specific task during the live broadcast.

Implementation of embodiments of the invention may take a variety of forms, and exemplary implementation details are discussed subsequently with reference to the Figures.

In an embodiment, a system executing a web conference perspective view sharing method identifies each user participating in a web conference. For each prospective meeting participant (e.g., user), the method receives a set of data identifiers, including for example audio data, video data, system conditions (e.g., local computing device viewing settings, login credentials, etc.), etc. The prospective participant data further includes login credentials or authentication of a particular user based on a cert matrix of usage of the participant. In this embodiment, the method receives the participant data (e.g., the set of data identifiers) for each prospective participant and associates the received data with the prospective participants. Also, the method assigns a unique identifier (e.g., alphanumeric value) to each prospective participant of the web conference, and corresponding data of the participants. In this embodiment, the received data is provided by the prospective participants and used for the disclosed method with the consent of the prospective participants. The data may be provided to the system executing the method by the participants themselves or collected by a meeting/call host and provided as set of participant data associated with a particular scheduled meeting such that only data associated with the participants invited for participation at a particular location is provided by the host to the system for use by the method. For example, each user has an account that the users can log into when connecting to a web call (i.e., authenticating an account), the method assigns each account a unique identifier. In this example, the method links the unique identifier to the information (e.g., the received data) sent to a remote server (e.g., the system executing the web conference, cloud-based server, etc.).

In an embodiment, the method determines a role of users participating in the web conference. For each prospective meeting participant (e.g., user), the method identifies the role of each prospective meeting participant. The roles of users can be defined by the user when joining a web conference. For example, a host assigns a role to a participant in a meeting notice. In this example, the method receives a user confirmation from a computing device of the participant that indicates whether the user accepts the assigned role or selects a different role when joining a web conference corresponding to the meeting notice. In this embodiment, the method can receive login credentials or authentication of a particular user and determine a role of the particular user using various data sources. For example, the data sources can include data such as a company hierarchy, which the method utilizes to map a particular user to an associated team structure, job function, status (e.g., management, associates, etc.), etc. Additionally, the roles of users can have a persistent state, which the method monitors continuously as the role of the users may change based circumstances or selections of users within a web conference.

In this embodiment, the method can assign a subscription level to a determined role of a user. For example, the subscription level may be utilized to grant a user access to perspective views corresponding to screen content of additional participants in a web conference that are not the host. Additionally, the method can base access and/or subscription level of a user on the login credentials and/or the various data sources.

In an embodiment, the method determines a first user provided screen content to a web conference of the system. In this embodiment, the method receives confirmation from the web conference of the system that the first user is sharing screen content corresponding to a computing device of the first user. The first user can be a host/presenter of the web conference and/or a root node in a tree structure corresponding to participants (e.g., child nodes) of the web conference. For example, the confirmation can include a notification to a second user. In this example, the second user can provide the confirmation of receipt of the screen content of the first user to the method. In this embodiment, the provided screen content of the first user corresponds to a first view of the computing device of the first user.

In an embodiment, the method generates a second perspective view of the provided screen content of the first user for a second user. For each meeting participant (e.g., user), the method identifies local viewing settings (e.g., standard viewing font size, preferences, etc.) of computing devices of participants and modifies screen content a first user (e.g., presenter, host, etc.) provides to the system executing the method, resulting in a second perspective view (i.e., modifying text and/or object size of screen content to generate a second perspective view for a second user based on the provided screen content without interrupting the first user or modifying screen content of a first perspective view of the first user). Additionally, for each meeting participant the method stores parallel streams of respective views of screen content of participants in a memory device of the system (e.g., remote server, cloud, etc.) executing the method and organizes the parallel streams based on data (e.g., IDs, roles, etc.) associated with each of the respective participants. For example, if a presenter (e.g., a first user) shares screen content in a web conference, then the method enables each viewer (e.g., second user, participants, etc.) in the web conference to autonomously stream a respective perspective view of the presenter's shared screen content to a remote server. Additionally, the method links/tags the streamed respective perspective views to a participant based on a unique identifier (e.g., alphanumeric value), role, and/or metadata (e.g., storage location, broadcast channel, etc.) the streamed respective perspective views. Furthermore, the method can associate the streamed respective perspective views with a subscription level of the participant for content viewing and/or sharing associations.

In the embodiment, the method receives user interactions with a graphical user interface (GUI) (e.g., zooming user interface (ZUI)) of the second user (e.g., viewer of the web conference) with a computing device and modifies the second perspective view of the provided screen content. For example, user interactions with a GUI can include the user pushing in/out on segments (e.g., zoom) of a second perspective view of provided content and zoom manually when required.

In an embodiment, the method receives a request of a third user of a web conference to view a second perspective view of the provided screen content of a second user. In one scenario, a system executing the method receives a transmitted request of a third user (e.g., child node) to view a perspective view of a second user (e.g., child node) of a web conference corresponding to screen content a first user (e.g., root screen sharer, presenter, host, etc.) shares (i.e., the third user requests a unique identifier attached to an account of the second user from the system executing the method). In this scenario, the method utilizes information (e.g., the unique identifier) of the request to locate the storage location of the perspective view of the second user and provides the perspective view of the second user to the third user (e.g., the method creates a nested shared screen session that includes the third user and a live stream of the perspective view). In the embodiment, the method can utilize identified roles and corresponding subscriptions of users (e.g., second user and third user) to determine whether to authorize access of the third user to the second perspective view of the provided screen content.

In an embodiment, the method provides a second perspective view of the provided screen content of a second user to a third user of a web conference. The method can provide the second perspective view of the provided screen content of the second user by push viewing (e.g., push) or pull viewing (e.g., pull). For example, the method can "push" a perspective of screen content of a second user to a third user that subscribes to a parallel feed of the second user that includes the perspective of screen content of the second user. In another example, the method can "pull" one or more parallel feeds of various participants to a third user based on a set of criteria (e.g., subscriptions, tasks, etc.).

Additionally, the method enables the second user to point out certain items, objectives, or notations during a web sharing experience by providing the second perspective view of the provided screen content of the second user to the third user based on a purpose of a request and/or role of users of the web conference (i.e., purpose or reason for social collaboration). For example, the method can determine a purpose of a request of a third user in a web conference by identifying tasks associated with respective roles of users. In an example embodiment, the method can determine that a user with a role of an application architect is associated with predefined tasks that include sharing the overall magnification and focus of architectural based decisions and designs of a system. In another example embodiment, the method can determine that a user with a role of a tester is associated with predefined tasks that include sharing primary items concerned with regression testing scope. In another example embodiment, the method can determine that a user with a role of a marketing or sales person is associated with predefined tasks that include magnification and focus of the features that will attraction potential buyers to the application.

In an embodiment, the method correlates web conference information and user activity to create a corpus. The corpus is a knowledge base that can include sharing associations, purpose, user interactions, roles, respective perspective views of shared content, etc. In this embodiment, the method collects user interactions of users with provided screen content and sharing of perspective views and updates the corpus for historical reference. As a result, the method iteratively cycles sharing associations over time to generate various types of sharing criteria with respect to roles of participants in a web conference. In the embodiment, the method utilizes the corpus to dynamically modify a subscription to a role of user in real or near real-time. For example, the method enables a user to toggle (e.g., select) between respective roles during a web conference. In this example, the method can provide (e.g., push or pull) shared content of other participants of the web conference to an overlay on a display of a computing device of the user based on subscriptions associated with the respective roles. In one scenario, a large web conference includes one or more sub-teams that comprise roles of presenters, team leads, team members, and stakeholders. In this scenario, the method provides a perspective view of screen content of a team member corresponds to screen content of a presenter to enable the team member to point out certain highly specific items to stakeholders during a large application demonstration. Additionally, the method creates a nested (feed within the feed) view of segments of the large application demonstration (e.g., team members screen content) and streams the nested view to the stakeholders, which includes highlights, magnifications, and pinpoints (e.g., various visual affects) the team member intends to share with the stakeholders. Furthermore, the method enables the team member to select to a different role (e.g., team lead) to view screen content of other team members and/or share feedback of stakeholders to the other team members.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise application program (not shown) together with sufficient computing resource (processor, memory, network communications hardware) to execute the program.

As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment may be made by those skilled in the art without departing from the scope of the invention as recited by the claims.

The present invention may contain various accessible data sources, such as client device 104, client device 110, and memory 158, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 175 enables the authorized and secure processing of personal data. Program 175 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Program 175 provides information regarding personal data and the nature (e.g., type, scope, purpose, duration, etc.) of the processing. Program 175 provides the user with copies of stored personal data. Program 175 allows the correction or completion of incorrect or incomplete personal data. Program 175 allows the immediate deletion of personal data.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the web conference program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., web conference program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
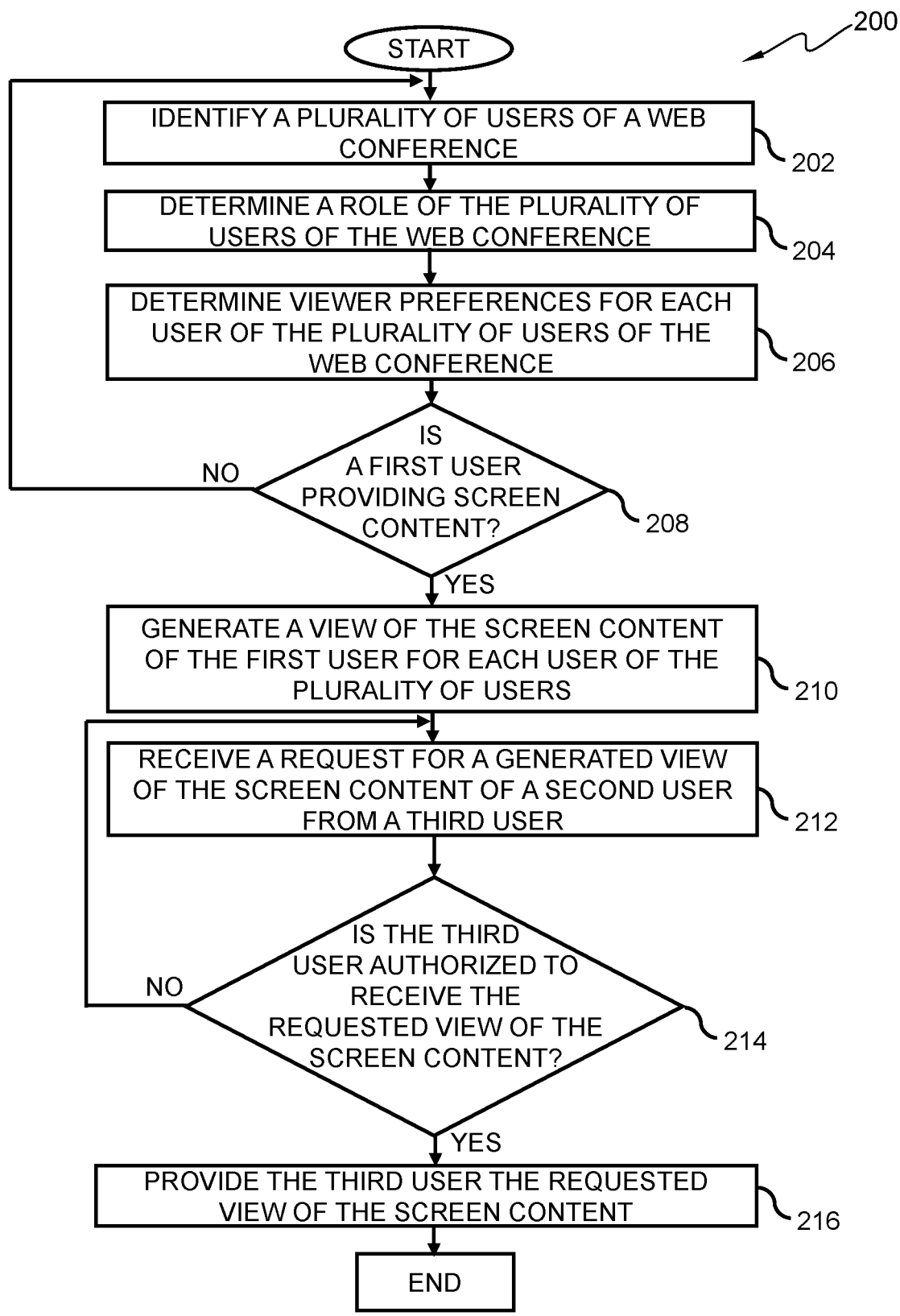
FIG. 2 provides a flowchart depicting an operational sequence for sharing a perspective view with users in a web conference, according to an embodiment of the invention.

FIG. 2 provides a flowchart 200, illustrating exemplary activities associated with the practice of the disclosure. In one embodiment, program 175 initiates in response to a user connecting client device 110 or client device 104 to a web conference through network 114. For example, program 175 initiates in response to a user registering (e.g., opting-in) a laptop (e.g., client device 104) with program 175 via a WLAN (e.g., network 114).

After program start, at block 202, the method of web conference program 175 identifies a plurality of users of a web conference. In an embodiment, the method generates a set of identifiers (e.g., data set) for each user participating in a web conference.

At block 204, the method of web conference program 175 determines a role of the plurality of users of the web conference. In an embodiment, the method determines a role of a user participating in a web conference. The method can also associate a subscription level with the user and shared content of the user.

At block 206, the method of web conference program 175 determines viewer preferences for each user of the plurality of users of the web conference. In an embodiment, the method determines viewer preferences of each user participating in a web conference based on a local computing device of the user.

At block 208, the method of web conference program 175 determines whether a first user is providing screen content. In an embodiment, the method determines whether a first user is sharing screen content during a web conference. The first user being a root node in tree structure associated with participants of the web conference. In one scenario, if the method determines the first user is not sharing screen content, then the method continues to generate sets of identifiers for each user participating in the web conference and monitoring for sharing of screen content by the first user. In another scenario, if the method determines the first user is sharing screen content, then the method provides the shared screen content to additional user participating in the web conference.

At block 210, the method of web conference program 175 generates a view of the screen content of the first user for each user of the plurality of users. In an embodiment, the method can utilize user interactions and viewer preferences of a second user to modify shared screen content of a first user and generate a perspective view of the shared screen content for the second user. Additionally, the method can generate perspective views corresponding to each user participating in a web conference, which are stored streamed in parallel to a remote server (e.g., cloud-based server) for storage. The method can organize storage of the generated perspective views based on sets of identifiers (e.g., data set) and/or roles of the users.

At block 212, the method of web conference program 175 receives a request for a generated view of the screen content of a second user from a third user. In an embodiment, the method receives a request of a third user to access a generated perspective of a second user participating in a web conference. The request may include an identifier corresponding to the second user and a subscription level of the third user, which can be used to authorize access of the third user.

At block 214, the method of web conference program 175 determines whether a third user is authorized to receive the requested view of the screen content. In an embodiment, the method determines whether a third user authorized to access a perspective view of screen content of a second user during a web conference. In one scenario, if the method determines the third user is not authorized to access of the perspective view of screen content of the second user, then the method denies the request of the third user. In another scenario, if the method determines the third user is authorized to access of the perspective view of screen content of the second user, then the method utilizes information of the request to locate a storage location of the perspective view of the second user and provides the perspective view of the second user of shared screen content to the third user.

At block 216, the method of web conference program 175 provides the third user the requested view of the screen content. In an embodiment, the method transmits a perspective view of screen content of a second user to a display of a computing device of a third user. The method can create a nested view of within the display of the computing device of the third user that includes the perspective view of screen content of the second user during a web conference.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
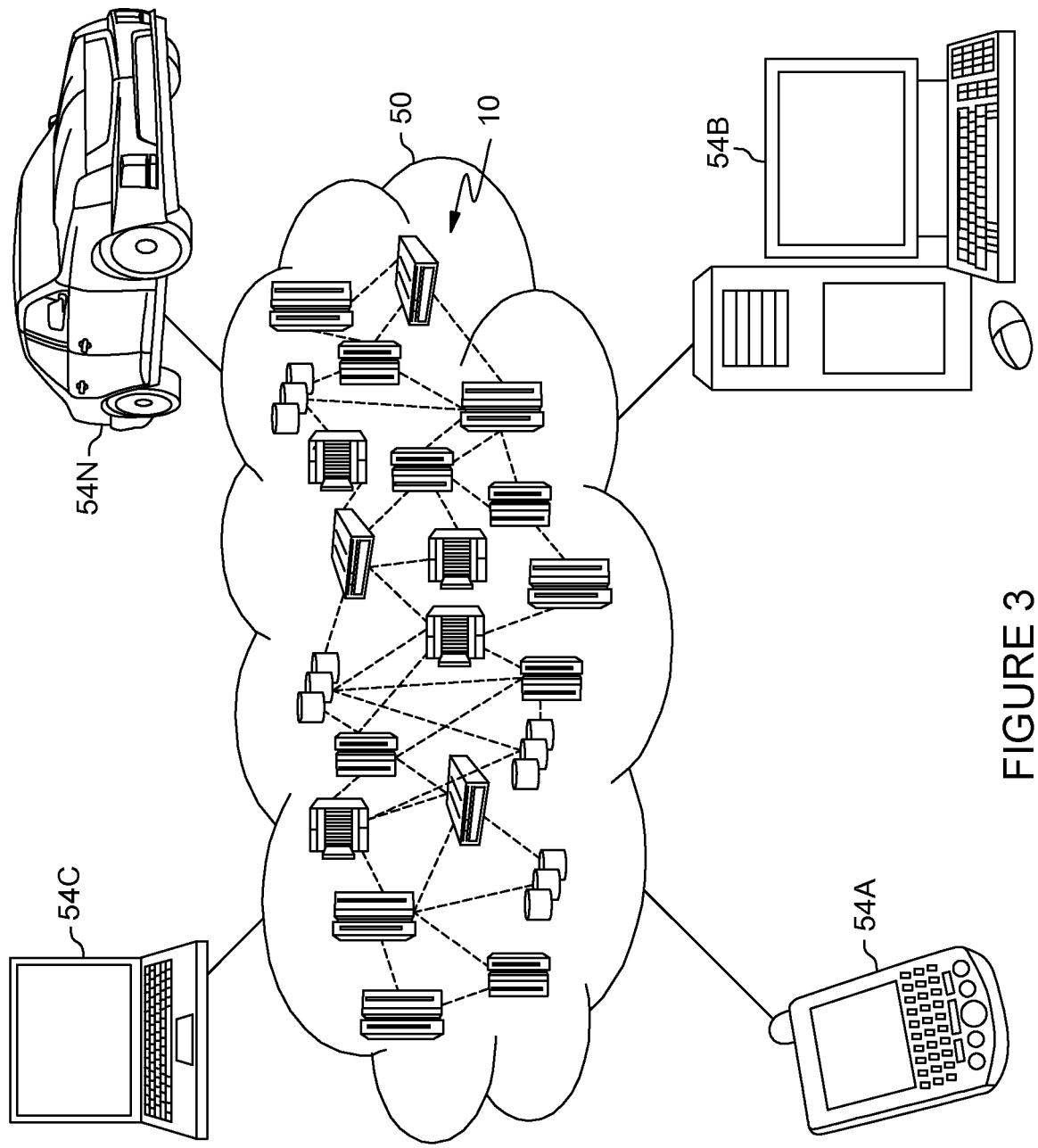
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
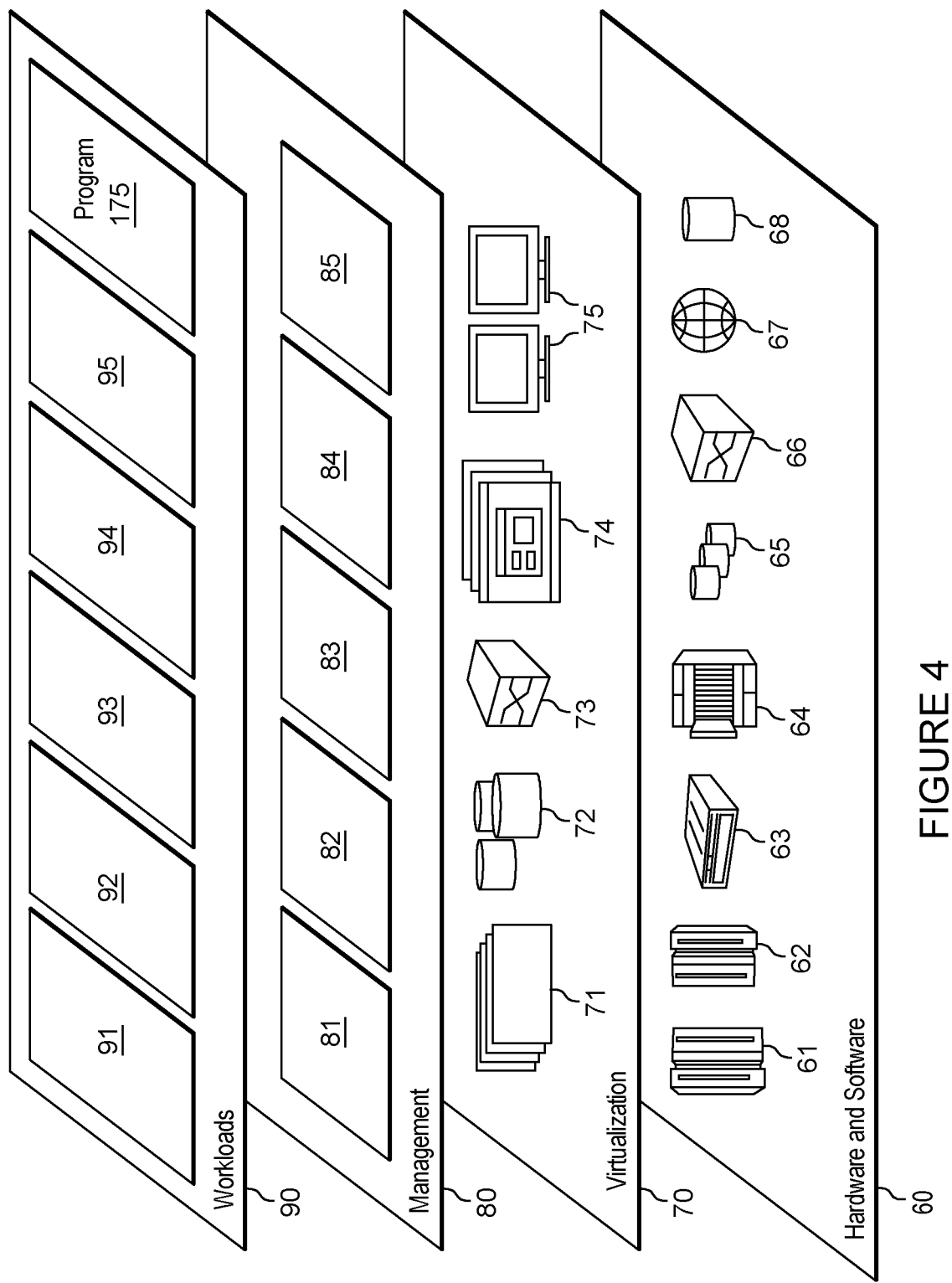
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and web conference program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for sharing a perspective view with users in a web conference, the method comprising:
    identifying each user participating in a web conference;
    authorizing a user participating in the web conference;
    determining a role of at least two users participating in the web conference;
    determining a first user provides screen content to the web conference, wherein the provided screen content of the first user corresponds to a first view of the first user;
    generating a second perspective view of the provided screen content of the first user for a second user, wherein the second perspective view is the provided screen content with a modification of content shared from the first view based on an input of the second user; and
    providing the second view of the provided screen content to the second user.

2. The computer implemented method according to claim 1, further comprising:
    receiving a request of a third user to view the second perspective view of the provided screen content; and
    determining whether a respective role of the third user permits sharing of the second perspective view of the provided screen content with the third user.

3. The computer implemented method according to claim 2, further comprising:
    in response to determining that the respective role of the third user permits sharing of the second perspective view of the provided screen content with the third user, identifying a selection of a preferred view of the third user; and
    providing the second perspective view of the provided screen content to the third user based at least in part on the selection of the third user.

4. The computer implemented method according to claim 1, further comprising:
    determining a respective subscription level of the at least two users based at least in part on a respective role of the at least two users; and
    linking a respective perspective view of the at least two users with the respective subscription level.

5. The computer implemented method according to claim 1, further comprising:
    identifying user interactions with respective views of shared content; and
    generating a knowledge base based at least in part on the user interactions with the respective views of shared content.

6. The computer implemented method according to claim 1, wherein generating the second perspective view of the provided screen content of the first user for the second user, further comprises:
    identifying viewing preferences of the second user based at least in part on a computing device of the second user; and modifying the second perspective view of the provided screen content during the web conference based at least in part on the identified viewing preferences of the second user.

7. The computer implemented method according to claim 6, wherein modifying the second perspective view of the provided screen content during the web conference based at least in part on the identified viewing preferences of the second user, further comprises:
identifying one or more user interactions with one or more elements of the provided screen content of the second perspective within a display of a computing device of the second user, wherein the one or more user interactions correspond to changes in scale of areas corresponding to the one or more elements; and
altering the second perspective view of the provided screen content of the first user of the web conference without interrupting the first user based at least in part on the one or more user interactions, wherein the second perspective view includes the changes in scale of the areas corresponding to the one or more elements.

8. A computer program product for sharing a perspective view with users in a web conference, the computer program product comprising one or more computer readable storage devices and collectively stored program instructions on the one or more computer readable storage devices, the stored program instructions comprising:
program instructions to identify each user participating in a web conference;
program instructions to authorize a user participating in the web conference;
program instructions to determine a role of at least two users participating in the web conference;
program instructions to determine a first user provides screen content to the web conference, wherein the provided screen content of the first user corresponds to a first view of the first user;
program instructions to generate a second perspective view of the provided screen content of the first user for a second user, wherein the second perspective view is the provided screen content with a modification of content shared from the first view based on an input of the second user; and
program instructions to provide the second view of the provided screen content to the second user.

9. The computer program product according to claim 8, the stored program instructions further comprising:
program instructions to receive a request of a third user to view the second perspective view of the provided screen content; and
program instructions to determine whether a respective role of the third user permits sharing of the second perspective view of the provided screen content with the third user.

10. The computer program product according to claim 9, the stored program instructions further comprising:
in response to determining that the respective role of the third user permits sharing of the second perspective view of the provided screen content with the third user, program instructions to identify a selection of a preferred view of the third user; and
program instructions to provide the second perspective view of the provided screen content to the third user based at least in part on the selection of the third user.

11. The computer program product according to claim 8, the stored program instructions further comprising:

program instructions to determine a respective subscription level of the at least two users based at least in part on a respective role of the at least two users; and
program instructions to link a respective perspective view of the at least two users with the respective subscription level.

12. The computer program product according to claim 8, the stored program instructions further comprising:
program instructions to identify user interactions with respective views of shared content; and
program instructions to generate a knowledge base based at least in part on the user interactions with the respective views of shared content.

13. The computer program product according to claim 8, wherein program instructions to generate the second perspective view of the provided screen content of the first user for the second user, further comprise program instructions to:
identify viewing preferences of the second user based at least in part on a computing device of the second user; and
modify the second perspective view of the provided screen content during the web conference based at least in part on the identified viewing preferences of the second user.

14. The computer program product according to claim 13, wherein program instructions to modify the second perspective view of the provided screen content during the web conference based at least in part on the identified viewing preferences of the second user, further comprise program instructions to:
identify one or more user interactions with one or more elements of the provided screen content of the second perspective within a display of a computing device of the second user, wherein the one or more user interactions correspond to changes in scale of areas corresponding to the one or more elements; and
alter the second perspective view of the provided screen content of the first user of the web conference without interrupting the first user based at least in part on the one or more user interactions, wherein the second perspective view includes the changes in scale of the areas corresponding to the one or more elements.

15. A computer system for sharing a perspective view with users in a web conference, the computer system comprising:
one or more computer processors;
one or more computer readable storage devices; and
stored program instructions on the one or more computer readable storage devices for execution by the one or more computer processors, the stored program instructions comprising:
program instructions to identify each user participating in a web conference;
program instructions to authorize a user participating in the web conference;
program instructions to determine a role of at least two users participating in the web conference;
program instructions to determine a first user provides screen content to the web conference, wherein the provided screen content of the first user corresponds to a first view of the first user;
program instructions to generate a second perspective view of the provided screen content of the first user for a second user, wherein the second perspective view is the provided screen content with a modification of content shared from the first view based on an input of the second user; and program instructions to provide the second view of the provided screen content to the second user.

16. The computer system according to claim 15, the stored program instructions further comprising:

program instructions to receive a request of a third user to view the second perspective view of the provided screen content; and program instructions to determine whether a respective role of the third user permits sharing of the second perspective view of the provided screen content with the third user.

17. The computer system according to claim 16, the stored program instructions further comprising:

in response to determining that the respective role of the third user permits sharing of the second perspective view of the provided screen content with the third user, program instructions to identify a selection of a preferred view of the third user; and program instructions to provide the second perspective view of the provided screen content to the third user based at least in part on the selection of the third user.

18. The computer system according to claim 15, the stored program instructions further comprising:

program instructions to determine a respective subscription level of the at least two users based at least in part on a respective role of the at least two users; and program instructions to link a respective perspective view of the at least two users with the respective subscription level.

19. The computer system according to claim 15, the stored program instructions further comprising:

program instructions to identify user interactions with respective views of shared content; and program instructions to generate a knowledge base based at least in part on the user interactions with the respective views of shared content.

20. The computer system according to claim 15, wherein program instructions to modify the second perspective view of the provided screen content during the web conference based at least in part on the identified viewing preferences of the second user, further comprise program instructions to:

identify viewing preferences of the second user based at least in part on a computing device of the second user; and modify the second perspective view of the provided screen content during the web conference based at least in part on the identified viewing preferences of the second user.

\* \* \* \* \*